(12) United States Patent
Finot et al.

(10) Patent No.: US 8,989,576 B2
(45) Date of Patent: Mar. 24, 2015

(54) DEVICE AND METHOD FOR PROCESSING AN OPTICAL SIGNAL

(75) Inventors: Christophe Finot, Dijon (FR); Julien Fatome, Auxonne (FR)

(73) Assignees: Universite de Bourgogne, Dijon (FR); CNRS—Centre National de Recherche Scientifique, Paris (FR)

(*) Notice: Subject to any disclaimer, the term of this patent is extended or adjusted under 35 U.S.C. 154(b) by 247 days.

(21) Appl. No.: 13/637,915

(22) PCT Filed: Mar. 24, 2011

(86) PCT No.: PCT/FR2011/050628
§ 371 (c)(1),
(2), (4) Date: Oct. 25, 2012

(87) PCT Pub. No.: WO2011/121213
PCT Pub. Date: Oct. 6, 2011

(65) Prior Publication Data
US 2013/0039653 A1    Feb. 14, 2013

(30) Foreign Application Priority Data

Mar. 29, 2010    (FR) ..................................... 10 52276

(51) Int. Cl.
*H04B 10/08*    (2006.01)
*H04B 10/299*    (2013.01)
*H04B 10/079*    (2013.01)

(52) U.S. Cl.
CPC .......... *H04B 10/299* (2013.01); *H04B 10/0795* (2013.01)

USPC ................. 398/38; 398/25; 398/37; 398/180; 398/210; 398/213

(58) Field of Classification Search
CPC .. H04B 10/07–10/0799; H04B 10/29–10/296; H04B 10/299
USPC ....................... 398/16–38, 173–182
See application file for complete search history.

(56) References Cited

U.S. PATENT DOCUMENTS 6,718,138 B1 * 4/2004 Sugawara .......................... 398/9
6,822,591 B2 * 11/2004 Kim et al. ...................... 341/137

(Continued)

FOREIGN PATENT DOCUMENTS

FR      2776132 A1    9/1999

OTHER PUBLICATIONS

Vu Van San, "Sensitivity of 10 Gbit/s Optically Amplified Receiver with Signal Waveform Variation", Journal of Optical Communications, Fachverlag Schiele & Schon, Berlin, DE, vol. 22, No. 6, Dec. 1, 2001, pp. 210-214, XP001161803.

*Primary Examiner* — Li Liu
(74) *Attorney, Agent, or Firm* — Duane Morris LLP; J. Rodman Steele, Jr.; Gregory M. Lefkowitz (57) ABSTRACT

A method of processing optical signal (TE) whose power ($P_E$) varies in a random manner in a range of variation of power ($\Delta P_E$) around a mean power ($P_{E\phi}$), the processing of the optical signal (TE) generating processing noise ($G_{ELECTRONIC}$), characterized in that the relative variation of power ($G_E$) of at least a temporal part at said optical signal (TE) is optically amplified.

12 Claims, 6 Drawing Sheets

(56) References Cited

U.S. PATENT DOCUMENTS

| | | |
|---|---|---|
| 2002/0003653 A1* | 1/2002 | Takeda et al. .............. 359/333 |
| 2003/0002135 A1* | 1/2003 | Futami et al. .............. 359/326 |
| 2004/0109221 A1* | 6/2004 | Kim et al. .................. 359/248 |
| 2004/0213565 A1* | 10/2004 | Kamalov et al. ............ 398/26 |
| 2005/0220388 A1 | 10/2005 | Hironishi et al. |
| 2006/0051100 A1* | 3/2006 | Watanabe .................. 398/152 |
| 2007/0230967 A1* | 10/2007 | Akiyama .................... 398/160 |
| 2008/0231945 A1 | 9/2008 | Piehler et al. |
| 2008/0232817 A1* | 9/2008 | Futami et al. .............. 398/160 |
| 2010/0040381 A1* | 2/2010 | Ohtani ........................ 398/182 |
| 2010/0221014 A1* | 9/2010 | Watanabe et al. ............ 398/81 |

* cited by examiner

DEVICE AND METHOD FOR PROCESSING AN OPTICAL SIGNAL

CROSS-REFERENCE TO RELATED APPLICATIONS

This application is a §371 national stage entry of International Application No. PCT/FR2011/050628, filed Mar. 24, 2010, which claims priority to French Patent Application No. 1052276 filed Mar. 29, 2010, the entire contents of which are incorporated herein by reference.

FIELD OF THE INVENTION

The present invention relates to a device and a method for processing an optical signal whose power varies in a random manner in a power variation range around a mean power.

BACKGROUND OF THE INVENTION

In the field of high-speed optics—reference is made to signals having very short pulses—the performance of an optical signal, emitted in the form of a train of pulses by a pulsed laser source, is likely to be influenced in particular by two factors: variations in amplitude (or power) and temporal variations of the signal.

Under these conditions, knowledge of power variations of an optical signal, of which the relationship to the mean power of the signal is generally referred to as the relative amplitude jitter or relative power jitter, is of great importance in order to characterize an ultra-short (picosecond or femtosecond) source, both in terms of quality and stability, for applications such as optical telecommunications, but also for any type of application in which the stability of the signal is a main criterion (producing a supercontinuum, metrology, etc.).

In order to determine this relative amplitude jitter, it is known to carry out processing of the optical signal, processing which consists in electronically measuring the power of at least one temporal portion of the optical signal. For this, a photodiode receives the optical signal and converts it into an electrical signal, having a pace adapted to the rate of repetition of the pulses (in the case of a pulsed signal) or to a predetermined measurement repetition rate, and this electrical signal is then directly analysed. The relative optical amplitude jitter is then transformed into the relative electrical amplitude jitter, which electrical amplitude jitter can then easily be quantified by conventional means, such as a digital sampling oscilloscope optionally provided with computer analysis tools.

By its electronic nature, said solution provides a certain flexibility in terms of data use. It makes it possible to visualise the measured jitter in a synthetic manner, for example represented in the form of an "eye diagram" for which the different measured portions of the signal are resynchronised and superposed, the thickness represented on the diagram directly indicating the range of power variation of the signal. It is also possible, owing to an electronic measurement of this type, to establish a statistical analysis of the amplitude variation of the signal from histograms, and this makes it possible to provide more precise information about the relative amplitude variation of said signal, that is to say the power probability density law.

An electronic measurement device of this type is extremely well suited to analysing an optical signal having a relative power jitter which is at least moderate (significantly higher than 20%), even significant, which is the case for strings of pulses degraded by optical transmission over a long distance.

On this basis, this device is currently used for evaluating quality factors in the field of optical telecommunications.

However, this device has a major drawback when a low level of relative power jitter is being measured. This is because, as with any type of processing applied to an optical signal, said device generates a processing noise which is independent of the optical signal. In this particular case of an electronic measurement device, the photodiode and the electronics associated therewith produce relative amplitude variations of which the order of magnitude is generally between 2 and 5%. Due to the random nature of this processing noise and the relative power variation intrinsic to the optical signal, they combine in a random manner, in such a way that the initial optical jitter can be scrambled within the processing noise when said noise and said power variation have substantially similar orders of magnitude. For this reason, resorting to electronic measurement for a signal having a low relative amplitude jitter cannot be considered to be relevant.

Of course, a drawback of this type can be overcome by using an electronic device having a greater stability, for which the processing noise produced is lower, but this can only be carried out at significant extra cost.

To eliminate the influence of electronic processing noise, it is known to carry out a radio-frequency analysis of the signal, as described for example in the publication "Characterization of the noise in continuously operating mode-locked lasers" (D. Von der Linde, Appl. Phys. B 39, 201-217, 1986). In order to achieve this, an appropriate photodetector is used which is associated with an electronic spectrum analyser in order to analyse the spectral properties of a large number of harmonics of the rate of repetition of the optical signal. In this way, the spectrum analysis allows the relative power jitter which is likely to be produced by the photodetector to be compensated.

However, a measurement system of this type requires a high bandwidth photodetector. It is in particular not adapted, moreover, for trains of pulses having a high rate of repetition, typically greater than 5 GHz, unless of course excessively expensive electronic spectrum analysers are provided.

Still with the object of eliminating the influence of the electronic processing noise, another solution is that of analysing the optical signal by intensity autocorrelation, as is described for example in the publication "All-optical measurements of background, amplitude, and timing jitters for high speed pulse trains or PRBS sequences using autocorrelation function" (J. Fatome et al., Opt. Fiber. Technol., 84-91 2007) or in the patent specification US 2003/0095304. This analysis method consists essentially in establishing an optical correlation between at least two successive pulses of a pulsed optical signal, then in deriving therefrom a power probability distribution function. The use of electronics which are too large is therefore avoided.

However, a number of drawbacks result from the distinctive optical properties of this system. Said system implements polarisation components which consequently make it dependent on polarisation and which may therefore limit the potential applications thereof. Moreover, it involves a high number of mechanical parts, which proves expensive and complex to control mechanically, and it also requires the light beam to be propagated at least in part in the open air, where it is likely to be degraded, and this limits the precision of the measurements. In addition, since the correlation between two successive pulses is carried out by introducing a delay of the first pulse relative to the second, it may be necessary to provide a very long propagation space for the pulse to be delayed in the case in which the rate of repetition of the optical signal is low. As a result, this system is not adapted to trains of pulses having a low rate of repetition, typically less than 20 GHz.

SUMMARY OF THE INVENTION

The object of the present invention is to overcome these drawbacks and the invention relates to a device and a method for processing an optical signal whose power varies in a random manner and is determined by a power probability density law which is included in a power range which defines a power variation range around a mean power, in order to:
provide advantages provided by determined processing, for example electronic measurement which is in particular low cost, an adaptation to any rate of repetition envisaged and a capacity to use the measurements in a number of ways, and in order to
overcome the drawbacks involved in this processing, such as scrambling of the optical signals having a low relative amplitude jitter.

For this purpose, according to the invention, the processing method of the above-defined type is noteworthy for the fact that:
an optical transfer function is established whose graphical representation in a graph "input power–output power" has at least a substantially monotonic portion which defines an input power threshold for which the extension of the substantially monotonic portion produces zero output power,
the substantially monotonic portion and the power range are arranged in such a manner that:
said substantially monotonic portion includes substantially at least the portion of the power range for which the power probability density is high and
said power threshold is outside the power range and has a mean power deviation which is substantially less than said mean power and
said substantially monotonic portion is applied to at least one temporal portion of the optical signal in order to optically amplify the relative power variation of said temporal portion.

Owing to the invention, and by analogy with the field of photography, a purely optical "zoom" is provided on the relative power variation of the optical signal. This optical zoom, which can be completely parameterised, allows the level of the relative power jitter of the signal to be controlled, in order to carry out the subsequent processing thereof, for example electronic measurement. The invention makes it possible to increase the relative power variation of the optical signal sufficiently to exceed the noise produced by the processing, that is to say to give it an order of magnitude greater than that of the processing noise, which therefore allows the influence of unwanted noise of this type to be limited.

A person skilled in the art will note that the optical amplification of the power of an optical signal does not necessarily allow the relative power variation of this signal to be amplified. Indeed, an optical amplification following a predetermined amplification coefficient allows both the power variation range and the mean power of the signal to be amplified, in such a way that the relative power variation of said signal, as a relationship of said variation range to the mean power, is not amplified.

The invention thus consists in improving the processing of an optical signal, this processing being likely to produce a noise due to a purely optical amplification of the only relative power variation of this optical signal, prior to the initially envisaged processing.

A person skilled in the art, to whom the processing of optical signals is well known, will readily understand processing to mean any possible type of processing such as modulation, analysis and signal measurement.

Moreover, the invention is based on the electronic measurement of variations in an optical signal. In this context, the invention makes possible electronic measurement of the optical signal, it being possible to benefit from the advantages which this provides without being impacted by the drawbacks thereof, and this allows in particular:
the pace of the detector (limited by the bandwidth thereof) to be easily adapted to the rate of repetition of the signal and to the length of short pulses (anywhere from a nanosecond to a sub-picosecond),
extensive and diverse use of the received signal to be promoted, in particular for evaluating the relative power jitter and the power probability density, and
a large range of powers to be provided.

In addition, owing to the invention, the relative power jitter is increased in a purely optical manner. The power deviations between the pulses remain substantially proportional because of the monotonicity of the portion in question of the transfer function, which therefore allows the deviations between these pulses to be increased. In addition, by means of the positioning, according to the invention, of the input power threshold (for which the extension of the substantially monotonic portion produces zero output power), this amplification is not carried out by a proportionality coefficient alone, without which the relative jitter resulting therefrom, as is expressed in the form of the relationship between the power variation range and the mean power, would not be amplified. By contrast, the invention adds an amplification threshold, similar to the threshold voltage of an electronic diode, from which the portion in question of the transfer function carries out a power amplification of the pulses. This threshold, to the extent that it only applies to the mean power and not to the power variation range, therefore allows the relative power jitter to be amplified. More precisely, the closer this power threshold is to the mean power of the optical signal, the greater the amplification of the relative jitter.

In a particular embodiment, in which the optical signal is in the form of a string of pulses, the relative power variation is optically amplified between at least two of said pulses. Of course, the invention also applies to another, alternative signal, for example a continuous signal.

In order to subsequently measure the optical signal, the substantially monotonic portion can be applied to at least one temporal portion of the optical signal in order to optically amplify the relative power variation of said temporal portion in such a way that the amplified relative power variation exceeds the noise produced by the subsequent measurement.

Moreover, and in particular because of the monotonic nature of the graphical representation of the transfer function, the relative power jitter is not (or is only slightly) deformed, and this makes it possible to subsequently characterize the statistical distribution of the signal power in a detailed manner, the information obtained no longer being limited to the standard deviation (or power variation range) of this distribution. In other words, information can be extracted which is both quantitative (on the width of the distribution) and qualitative (on the form thereof). In addition, any type of linearity defect of the transfer function can be subsequently compensated electronically, to the extent that it is substantially monotonic.

It will be understood here to be particularly advantageous that the curve forming the transfer function is completely monotonic over the entire power variation range, but that the invention is not limited to this case. It may indeed be completely sufficient for it be monotonic for the power values having a high probability density. In the case, for example, of a probability density in the Gaussian form, it is important that the curve is monotonic in the central region of the Gaussian, without it necessarily being monotonic at the ends thereof. In other words, the optical zoom according to the invention allows for a form of "vignetting" (if the curve is not monotonic) or "distortion" (if the curve is not linear).

It is noted that resorting to optical processing of a pulsed signal is known, as for example in US 2005/220388, but has an opposite object to that of the invention, namely optical regeneration of a signal by a transfer function of which the mean gradient is as close to zero as possible over the power range of the signal, and this allows all of the pulses to be set to the same peak power level. Therefore, it is noted that, if the prior art suggests all-optical processing of a pulsed signal, it is only in order to arrive at an object which is exactly the opposite to that intended by the present invention, which consists precisely in amplifying the peak power variations instead of eliminating them, and this is in contradiction to the current practices in the field of processing optical signals, all of this only serving to highlight the patentability of the invention.

The substantially monotonic portion of the graphical representation of the transfer function preferably substantially includes the power range, and this prevents a portion of the power range of the optical signal from being deformed and therefore allows the relative power jitter of the signal to be amplified even more significantly.

In a case of this type, the substantially monotonic portion of the graphical representation of the transfer function can increase or decrease, it being preferred that it substantially increases over the power range.

The substantially monotonic portion of the graphical representation of the transfer function is preferably substantially linear over the power range, and this prevents the statistical power distribution of the signal from being deformed and therefore prevents said distribution from being accessed easily. Alternatively, it is also possible to subsequently compensate possible linearity defects electronically.

In an advantageous embodiment, the input power threshold is substantially close to the power range. In this way, the substantially monotonic portion of the graphical representation of the transfer function necessarily has, at the power range of the signal, a high mean gradient and optimum positioning of the input power threshold thereof, and this amplifies all the better the relative power jitter of said signal in accordance with the invention.

It is noted that it may seem necessary for the substantially monotonic portion of the graphical representation of the transfer function to have a mean gradient which is greater than one, however in practice this is not taken into account because of the losses inherent to any device in which the signal would be propagated. At the most, it would be expedient for the normalised gradient (for which the propagation losses would be derived) of the substantially monotonic portion of the graphical representation of the transfer function to be greater than 1.

In an equally advantageous embodiment, after optical amplification of the relative power variation of at least one temporal portion of the optical signal, the power thereof is measured electronically in order to analyse the power variations of said optical signal.

The use of optical processing according to the invention is therefore made possible in order to implement a method for analysing power variations of a pulsed optical signal, including when this signal has a low relative power jitter. The invention allows the relative jitter of the signal to be amplified in a purely optical manner, in such a way that the jitter produced by an electronic measurement becomes negligible relative to the amplified optical jitter.

In a particular embodiment in which it is desirable to know firstly the order of magnitude of the level of relative power jitter of the signal before optionally amplifying it optically according to the invention, it is possible to carry out the following succession of steps:
first, the power of at least one temporal portion of the optical signal is measured electronically,
the relative power variation of said signal is derived therefrom,
said relative power variation derived in that manner is compared with said electronic measurement noise, and,
in accordance with the result of said comparison, the relative power variation of at least one temporal portion of said signal is amplified optically in such a way that the amplified relative power variation exceeds the electronic measurement noise, then the power of said temporal portion is measured electronically.

Preferably, in order to eliminate the influence of the electronic noise of the power jitter, the relative power variation of at least one portion of the optical signal is amplified optically in such a way that said variation, after optical amplification, has an order of magnitude which is greater than the relative power variation produced by the electronic measurement.

Preferably, in order to optimally position the power range of the optical signal relative to the substantially monotonic portion of the graphical representation of the transfer function, the mean power of the optical signal is adjusted relative to an optimum operating point over the substantially monotonic portion, with regard to the power variation range and to the probability density law of said optical signal.

The invention also relates to a device for carrying out the method for processing an optical signal according to any of the above-defined embodiments, this device comprising:
means for establishing an optical transfer function whose graphical representation in a graph "optical input power–optical output power" has at least a substantially monotonic portion which defines an input power threshold for which the extension of the substantially monotonic portion produces zero output power and
means for applying said substantially monotonic portion to at least one temporal portion of the optical signal in order to optically amplify the relative power variation of said temporal portion.

In order to appropriately position the input power threshold, the means for establishing the optical transfer function comprise at least one optical element having non-linear optical properties. However, the invention is of course not limited to this type of optical element, to the extent that appropriate positioning of the input power threshold of the substantially monotonic portion is made possible, as may be the case in particular with an optical element having piecewise linear properties or linear properties at threshold.

In a particular embodiment, the means for establishing the optical transfer function comprise an optical fibre upstream of a band-pass filter, the features of the optical fibre being determined in such a way that the graphical representation of the optical transfer function has at least a substantially monotonic portion allowing, according to the invention, the relative power jitter of the optical signal to be amplified.

In an advantageous embodiment, the device according to the invention is arranged upstream of a device for electronically measuring the power of the optical signal in order to analyse, after optical amplification of the relative power variation of at least one portion of said signal, the power variations of said signal.

The invention therefore allows an analysis system for analysing power variations of a pulsed optical signal to be provided, this system comprising an optical processing device according to the invention, and an electronic measurement device downstream of the optical device.

In order to analyse the variations of the optical signal, the electronic device advantageously comprises a photodetector arranged to provide an electrical signal in accordance with the optical signal received, the pace of the photodetector being adapted to that of the pulses of the optical signal.

In order to evaluate the statistical power distribution of the optical signal, the electronic measurement device advantageously comprises means for acquiring and processing the electrical signal (dependent on the optical signal), these means being arranged in particular to establish the power probability density law of the optical signal.

In order to prevent these measures from being disturbed by a linearity defect in the substantially monotonic portion of the graphical representation of the transfer function, the electronic measurement device advantageously comprises means for acquiring and processing the electrical signal dependent on the optical signal, these means being arranged in particular to compensate the possible linearity defects of the transfer function.

In order to precisely adjust the mean power of the optical signal in accordance with the optimum operating point over the substantially monotonic portion of the graphical representation of the transfer function, the random power of the optical signal being included in a power range, the device according to the invention is advantageously arranged downstream of an optical amplifier, the amplifier being connected to the electronic measurement device by means of an electronic controller in order to adjust the power range of said signal in relation to the substantially monotonic portion of the graphical representation of the transfer function in accordance with a previous electronic measurement of the power of at least one temporal portion of said signal whose relative power variation has been amplified.

The invention may find a particularly advantageous application in the field of biophotonics, or more generally of photonics, in which it may be desirable to measure small signal variations in order to detect the presence of a chemical species in a sample. On this basis, the invention also relates to a method for detecting a chemical species in a sample, according to which an optical signal having zero relative power variation is transmitted to the sample in order to cause said optical signal to interact with said sample, and then the relative power variation of said optical signal is measured after interaction with said sample in order to detect the presence of said chemical species, said relative variation measurement producing a measurement noise. According to the invention, this method is noteworthy for the fact that the processing method according to any of the above embodiments is applied to the optical signal after interaction with said sample and before the measurement of said relative power variation in such a way that the amplified relative power variation of the optical signal after interaction exceeds said measurement noise. Therefore, the acquisition periods necessary for reliably measuring the signature of a chemical species to be detected can be significantly improved.

BRIEF DESCRIPTION OF THE DRAWINGS

Other features and advantages of the invention will be become clear from the following description with reference to the appended drawings, given by way of non-limiting example, in which.

In the figures, like reference symbols denote similar elements.

DETAILED DESCRIPTION OF THE INVENTION

Figure 1:
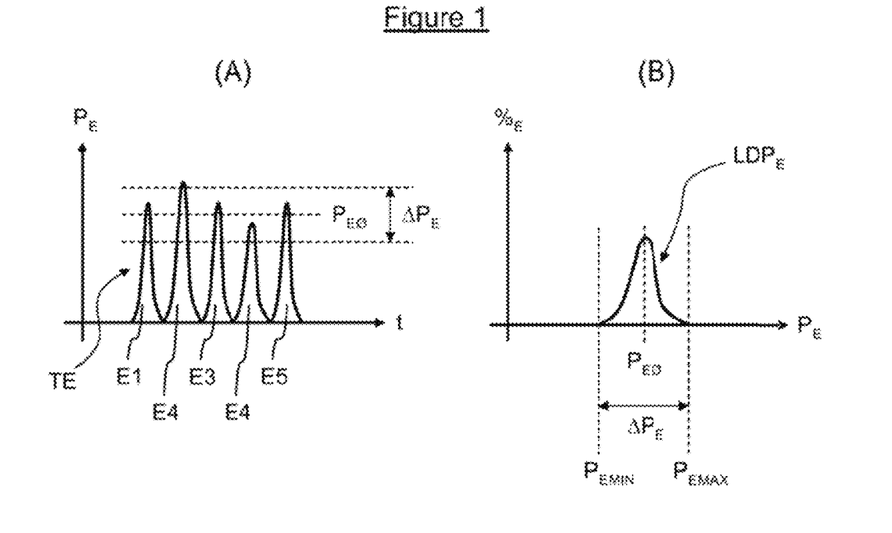
FIGS. 1A and 1B are graphs showing a pulsed optical signal before optical amplification according to the invention.

The optical signal TE of FIG. 1A is in the form of a train of pulses, comprising a succession of pulses E1, E2, E3, E4 and E5 having a given wavelength $\lambda_E$, following a given rate of repetition. The peak power $P_E$ of each pulse E varies in a random manner in a power range $[P_{EMIN}; P_{EMAX}]$, defined by a minimum power $P_{EMIN}$ and a maximum power $P_{EMAX}$, the power $P_E$ therefore varying around a mean power value $P_{E\varnothing}$, for example due to a degradation of the signal during the propagation thereof along an optical transmission line. This variation in the peak power $P_E$ occurs in a peak power random variation range $\Delta P_E$, of which the relationship to the mean power $P_E$) is generally known by the term relative power (or amplitude) jitter, equal to $\Delta P_E / P_{E\varnothing}$ and having reference symbol $G_E$. The peak powers $P_{E1}$ to $P_{E5}$ of pulses E1 to E5 are therefore between $P_{E\varnothing} - \Delta P_E/2$ and $P_{E\varnothing} + \Delta P_E/2$.

This random power variation can be represented in the form of a power probability density law $LDP_E$, as shown in FIG. 1B, which gives the statistical distribution of the powers $P_E$ of the pulses E of the optical signal in the power variation range $\Delta P_E$. In the present example, the statistical power distribution has substantially the form of a Gaussian centred on $P_{E\varnothing}$, of a total width of $\Delta P_E$ and a full width at half maximum of $\Delta P_E/2$. However, it is noted that this example is not limiting and that the invention applies equally to other types of statistical power distribution, as is shown subsequently by FIG. 10A to 10D.

In the case in which the relative power jitter $G_E$ has an order of magnitude which is close to that of the relative power jitter $G_{ELECTRONIC}$ which is likely to be produced by an electronic measurement device, for example of approximately 2 to 5%, the jitter noise inherent to the optical signal TE and the electronic jitter noise are added in a random manner, and this irreversibly scrambles this signal TE and prevents a return to the relative power jitter specific to the signal TE.

Figure 2:
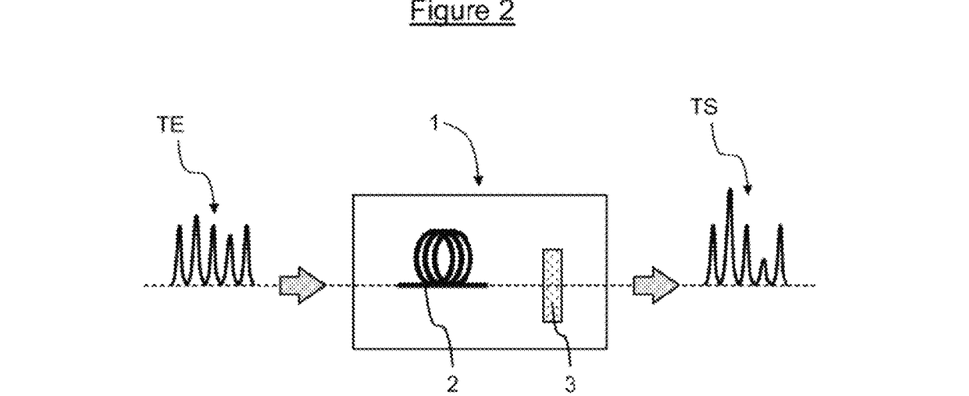
FIG. 2 is a schematic view of a processing device according to a first embodiment of the invention.

In order to amplify the relative power variation $G_E$ of the optical signal TE, the invention proposes the use of the processing device 1 of FIG. 2, which here comprises an optical fibre 2 and a band-pass filter 3. The fibre 2 is a highly non-linear fibre (high Kerr coefficient) consisting for example of silica, preferably having anomalous dispersion, in order to widen the spectrum of the signal TE by self-phase modulation in said fibre 2. The signal of which the spectrum is thus widened is then directed towards the filter 3, of which the central wavelength is substantially equal to the initial wavelength $\lambda_E$ of the signal TE.

In order to successfully amplify the relative power variation of the signal, some features of the fibre 2 (in particular the length thereof, the non-linearity coefficient thereof and the dispersion coefficient thereof) are appropriately selected in order to utilise the non-linear properties of the silica.

By way of example, an appropriate fibre may be a commercial non-linear fibre OFS having anomalous dispersion, for which:
the length is 4 km;
the non-linearity (Kerr) coefficient is $10 \; W^{-1} \cdot km^{-1}$;
the dispersion coefficient is $0.7 \; ps \cdot km^{-1} \cdot nm^{-1}$.

The filter 3 for example has a spectral full width of 1.5 nm at half maximum. It can be a band-pass filter which is common in the field, but it is preferably a filter made up of two cascaded Bragg gratings relayed by two optical circulators, and this allows a device having integral fibres to be implemented.

Figure 3:
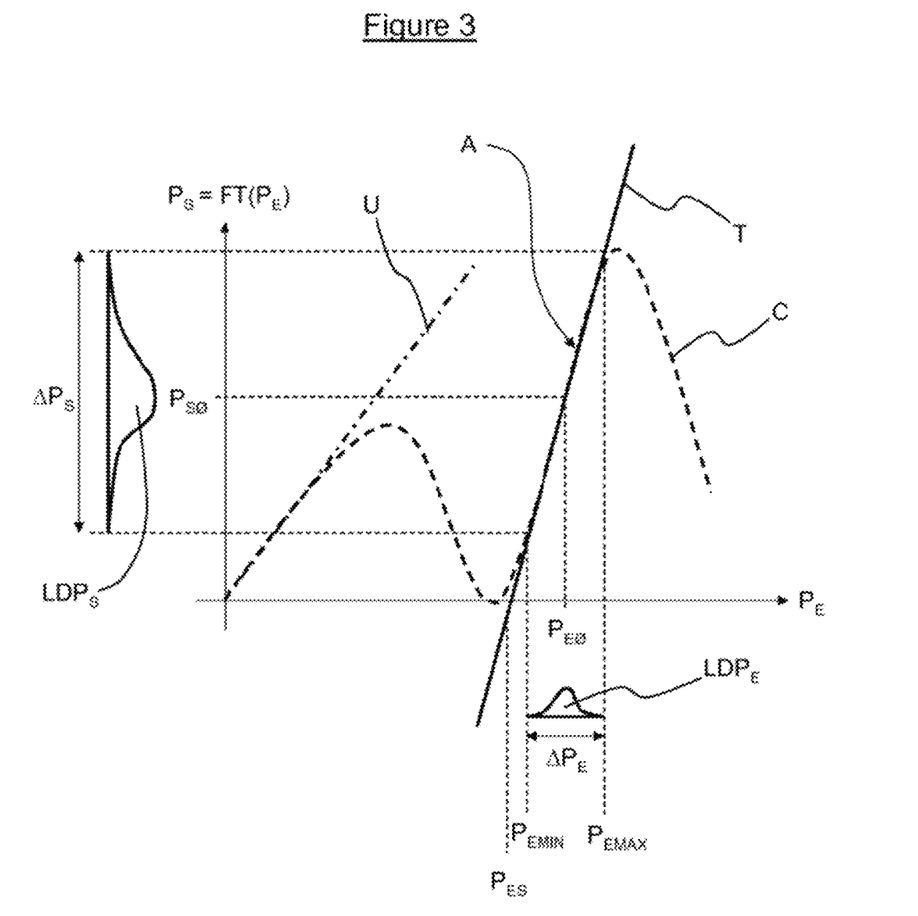
FIG. 3 is a graph showing the transfer function of the processing device of FIG. 2.

By arranging of a fibre 2 of this type and a filter 3 of this type, it is possible to establish the optical transfer function FT of FIG. 3 which defines the relationship between the peak power $P_S$ of the output signal and the peak power $P_E$ of the input signal of the device 1, by means of a function $P_S = FT(P_E)$ of which the graphical representation is given by the representative curve C (shown by a dotted line).

The first portion of this curve C (for low input powers) rises in a linear manner. The curve C is therefore tangential, from the origin, to the straight line U. The second portion of this curve C falls, then the third portion thereof rises again. It is this third portion of the curve C, provided with the reference symbol A and covering the range $[P_{EMIN}; P_{EMAX}]$, which is used according to the invention.

For this purpose, the power range $[P_{EMIN}; P_{EMAX}]$ is adjusted (or the mean power $P_{E\Theta}$ with regard to the peak power random variation range $\Delta P_E$) in such a way that this portion A:
is substantially monotonic, having a normalised mean gradient of an absolute value greater than one,
has an input power threshold $P_{ES}$ (for which the extension T of the portion A produces zero output power PS) which is outside the power range $[P_{EMIN}; P_{EMAX}]$ and has a deviation from the mean power $P_{E\Theta}$ which is substantially less than $P_{E\Theta}$, and
substantially includes the power range $[P_{EMIN}; PE_{MAX}]$.

The transfer function FT is quasi-linear over portion A in such a way that this curve can be approximated, from the point of view of the optical signal TE passing through the device 1, by the tangent T to the curve C at point $P_{E\Theta}$. The curve C can therefore be considered to be equivalent to a straight line of equation $P_S = B \cdot P_E + D$. In this equation, B represents the director coefficient of the straight line (the level of amplification of the signal) and D represents the ordinate at origin (the threshold from which the amplification is carried out). It is derived from this equation:
on one hand, $P_{S\Theta} = B \cdot P_{E\Theta} + D$, and
on the other hand, $\Delta P_S = B \cdot \Delta P_E$.

The relative jitter, resulting from device 1, becomes:

$$\frac{\Delta P_S}{P_{S0}} = \frac{B, \Delta P_E}{B, P_{E0} + D} = \frac{\Delta P_E}{P_{E0}} \cdot \frac{1}{1 + \frac{D}{B} \cdot \frac{1}{P_{E0}}}$$

The relative jitter is this increased by a factor K:

$$K = \frac{1}{1 + \frac{D}{B} \cdot \frac{1}{P_{E0}}}$$

If $P_{ES}$, input power threshold, is assigned for which the tangent T (which extends portion A) intersects the X axis (and thus produces a zero output power), it follows that:

$$P_{ES} = -\frac{D}{B} \; et \; K = \frac{1}{1 - \frac{P_{ES}}{P_{E0}}}$$

So that the relative jitter is increased, it is important for the amplification coefficient of the jitter to be such that $|K|>1$, which leads to the relationship:

$$-1 < 1 - \frac{P_{ES}}{P_{E0}} < 1 \Leftrightarrow 0 < P_{ES} < 2.P_{E0}$$

This inequality relationship takes into account both the case of a positive gradient and the case of a negative gradient. Therefore, more precisely, it is necessary that $0<P_{ES}<P_{E0}$ for a positive gradient and that $P_{E\Theta}<P_{ES}<2.P_{E0}$ for a negative gradient. It is therefore derived that the graphical representation of the transfer function FT has to be presented, according to the invention, in the form of a curve C of which a portion A is substantially monotonic over the range $[P_{E\Theta}-\Delta P_E/2; P_{E\Theta}+\Delta P_E/2]$ corresponding to the width of the range $\Delta P_E$, or at least over the range $[P_{E\Theta}-\Delta P_E/4; P_{E\Theta}+\Delta P_E/4]$ corresponding to the full width at half maximum for a Gaussian power distribution (for the case in which a monotonicity defect is allowed in the regions of low probability density). In addition, it is important that portion A is shifted relative to the origin of the graphical coordinate system, in such a way that the extension thereof (which can be taken at point $P_{E\Theta}$ when the portion A is linear) intersects the X axis at a power $P_{ES}$ such that $0<P_{ES}<2. P_{E0}$.

In order to inject, in accordance with the invention, the optical signal into the fibre 2 and the filter 3 (or, more generally, into the optical element having the appropriate optical transfer function), appropriate means (not shown) are used, for example a collimator or a convergent optical conjugation system. These means therefore allow the portion A to be applied to the pulses E of the optical signal TE in order to amplify the relative power variation $G_E$ of these pulses.

In this manner, a pulsed optical signal TS is obtained at the output of the optical processing device 1, processed in such a way that the power variation range $\Delta P_S$ thereof is widen relative to $\Delta P_E$, while not deforming (or deforming only slightly) the statistical power distribution $LDP_s$ relative to the input distribution $LDP_E$.

Figure 4:
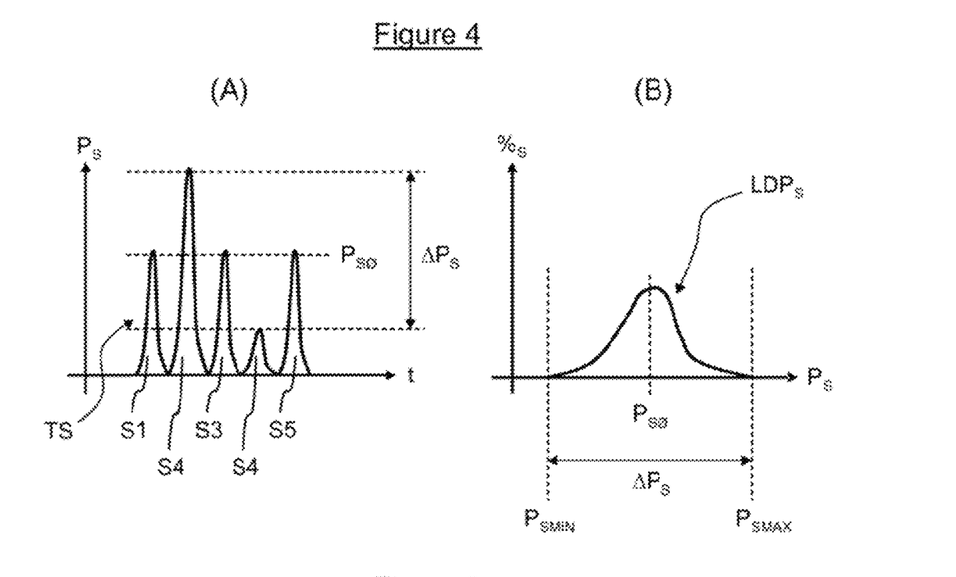
FIGS. 4A and 4B are graphs showing the pulsed optical signal after optical amplification according to the invention.

A signal TS of this type output from the device 1 is shown in greater detail in FIGS. 4A and 4B. The pulses S1, S2, S3, S4 and S5 of the signal TS each have an peak power $P_S$ amplified in a substantially uniform and linear manner relative to the peak power $P_E$ of the pulses E1 to E5, and this also amplifies the power deviations between the pulses S1 to S5, and the power range $[P_{SMIN}; P_{SMAX}]$ is therefore widened in such a way that the power variation range $\Delta P_S$ is increased. In the same way, the probability density law $LDP_S$ of the signal TS is extended without any deformation (or only slight deformation), this law $LDP_S$ being in the form of a Gaussian centred on the mean power $P_{S\Theta}$ and of the width $\Delta P_S$, and this amounts to having "zoomed" in on the probability density law $LDP_E$ of the initial signal TE in a purely optical manner.

A person skilled in the art will note that it is possible, from the example and the above-mentioned indications, to adapt the optical processing device 1 to the transfer function which he wishes to implement. A person skilled in the art will be able, for this purpose, to modify the characteristics of the optical fibre so as to give rise to the non-linear properties thereof over the power and wavelength range of the signal TE so as to obtain the desired transfer function FT.

A person skilled in the art will also note that the above-mentioned arrangement of the device 1 is only provided by way of example and that other types of non-linear components could be used, or alternatively linear components in pieces, or linear components at the threshold, for example non-linear crystals or certain types of semi-conductor such as diodes, on the condition that these components have to allow adaptation to the size and pace of the signal pulses.

The essential element is indeed the means for positioning the input power threshold in such a way that it is different from the zero power (in the case in which A increases) or from the symmetric of the zero power relative to the mean power $P_{E0}$, that is to say $2 \cdot P_{E0}$ (in the case in which A decreases). For this, a number of approaches are known and adapted to ultra-short optical pulses.

The following approaches are among the approaches for positioning this threshold and are well known to a person skilled in the art:
  spectral division (shifted or unshifted) of an optical spectrum widened by phase auto-modulation in an optical fibre, as described above;
  Raman frequency auto-shifting of solitons, followed by spectral division means of a filter through which large wavelengths can pass;
  Raman and Brillouin diffusions;
  mixing four waves in an optical fibre;
  non-linear optical loop mirrors in an optical fibre;
  non-linear polarisation rotation; and
  saturable absorbents having a high threshold.

In an advantageous embodiment, the non-linear function of the device 1 is integrated on a highly non-linear wave guide, for example made of chalcogenide or silicon, in order to confine this function to an optical chip, the size of the device thus being reduced.

A person skilled in the art will also note that the relative power jitter $G_E$ of the optical signal TE is amplified even further, since the director coefficient B of the tangent T is large and since the power $P_{ES}$ (for which said tangent T intersects the X axis) is close to the mean power $P_{E0}$.

A person skilled in the art will also note that, to the extent that the amplifier coefficient K of the relative jitter $G_E$ can be calibrated by the preliminary measure of the transfer function FT of the device 1, it is simple to return to the relative initial jitter $G_E$ from the relative jitter $G_S$ after optical processing.

Figure 5:
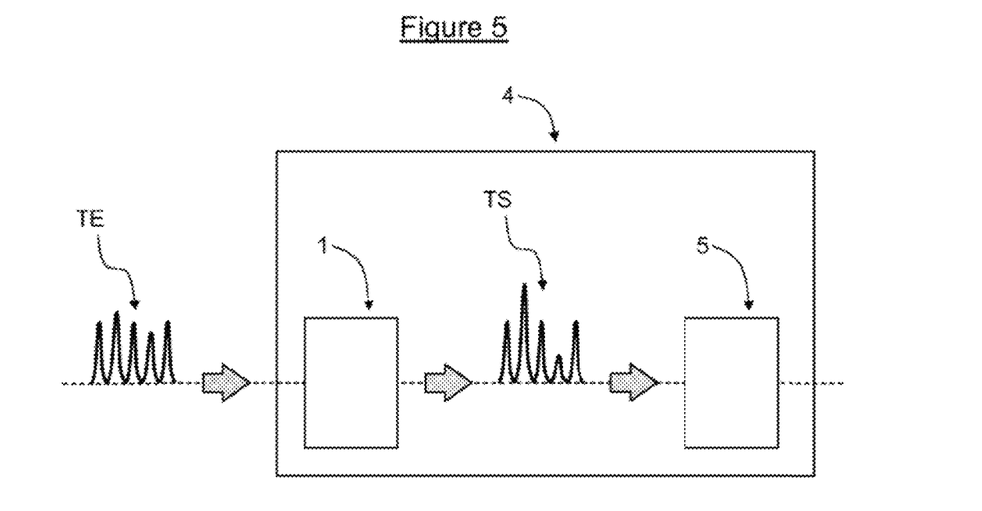
FIG. 5 is a schematic view of an analysis system according to a first embodiment of the invention.

The optical processing of a pulsed optical signal according to the invention can be applied to the power variation analysis of a signal, in order to evaluate in particular the relative power jitter $G_E$ thereof and the statistical power distribution $LDP_E$ thereof. For this, the measurement system 4 of FIG. 5 is used, which comprises an optical processing device 1 as described above and an electronic measurement device 5, arranged so as to receive the signal TS, resulting from the optical processing of the initial signal TE.

Figure 6:
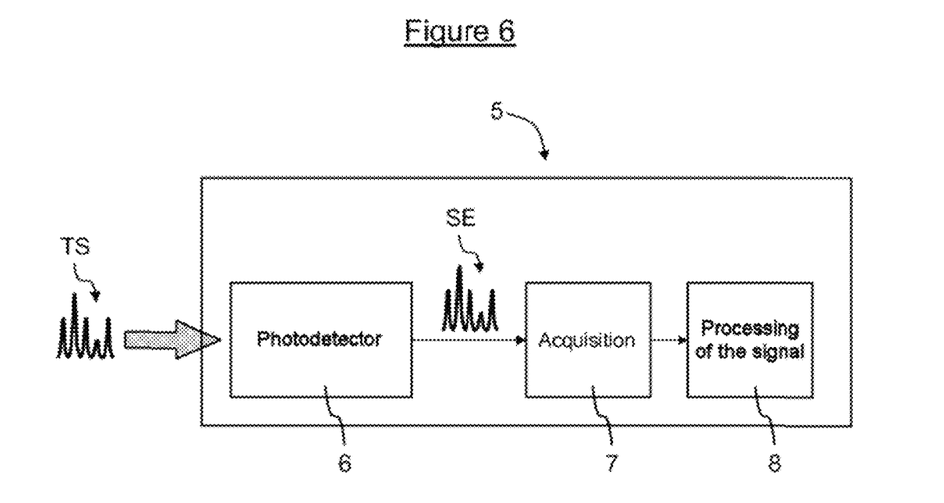
FIG. 6 is a schematic view of the electronic measurement device integrated into the analysis system of FIG. 5.

The electronic measurement device 5 more precisely comprises, with reference to FIG. 6, a photodetector 6 and means for acquiring and processing signals, provided respectively with reference symbols 7 and 8. The signal TS reaches the photodetector 6, the response time of which is comparable to the flow rate of said signal TS, so as to convert said optical signal TS into an electronic signal SE which is directly proportional thereto. This signal SE is then acquired by the means 7, then processed by the means 8, which are electronic elements which are well known to a person skilled in the art.

By way of example, for analysing a train of pulses which have a size of 2 picoseconds and are generated at a rate of repetition of 10 GHz, the photodetector 6 can be a photodiode of a bandwidth of 50 GHz, while the acquisition means 7 and the processing means 8 can be produced from a rapid sampling oscilloscope, possibly activated on the light source having produced the optical signal TE.

Figure 7:
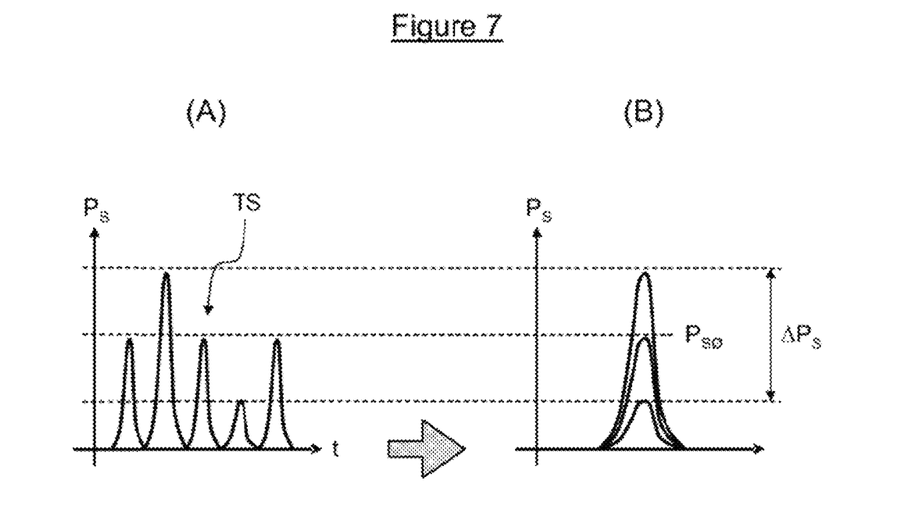
FIGS. 7A and 7B are graphs showing a particular variant of the electronic analysis of the signal according to the invention.

Signal visualisation means may also be provided in order to transmit visual and synthetic information on the signal TE to the user of the system 4, for example by producing an "eye diagram", obtained from the signal TS (FIG. 7A) by resynchronising and superposing all of the pulses S1 to S5, in such a way that the thickness of the upper part of the signal thus obtained (FIG. 7B) directly and visually provides information on the peak power variation range $\Delta P_S$.

Figure 8:
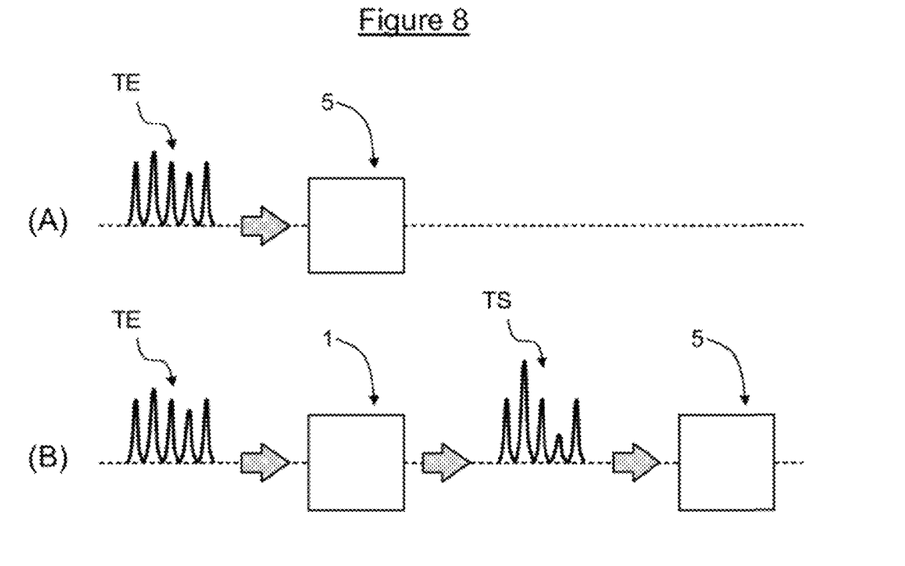
FIGS. 8A and 8B are schematic views of an analysis system having two successive steps for executing the analysis method according to a particular embodiment.

In an alternative to the embodiment of optical processing followed by electronic measurement, it is possible, as shown by FIGS. 8A and 8B, to firstly carry out electronic measurement of the power $P_E$ of the pulses E of the initial signal TE (FIG. 8A). The mean power $P_{E\emptyset}$, the power variation range $\Delta P_E$ and therefore the relative jitter $G_E$ can then be derived from this measurement. This jitter value is then compared with the relative jitter caused by the electronics of the device 5, $G_{ELECTRONIC} = \Delta P_{ELECTRONIC}/P_{E\emptyset}$, which can be determined beforehand. If the measured jitter has an order of magnitude which is greater than the jitter of the electronics unit, it appears that the measurement has not been disturbed by the electronic jitter and that it is therefore unnecessary to optically process the signal TE. If, however, the measured jitter has an order of magnitude which is less than or equal to the jitter of the electronics unit, it is important for processing of the type according to the invention to be carried out. For this, the device 1 (described with reference to FIG. 2) is inserted upstream of the device 5, and optical treatment of the signal TE is then carried out, followed by electronic measurement of the power $P_S$ of the signal TS after processing (FIG. 8B).

Figure 9:
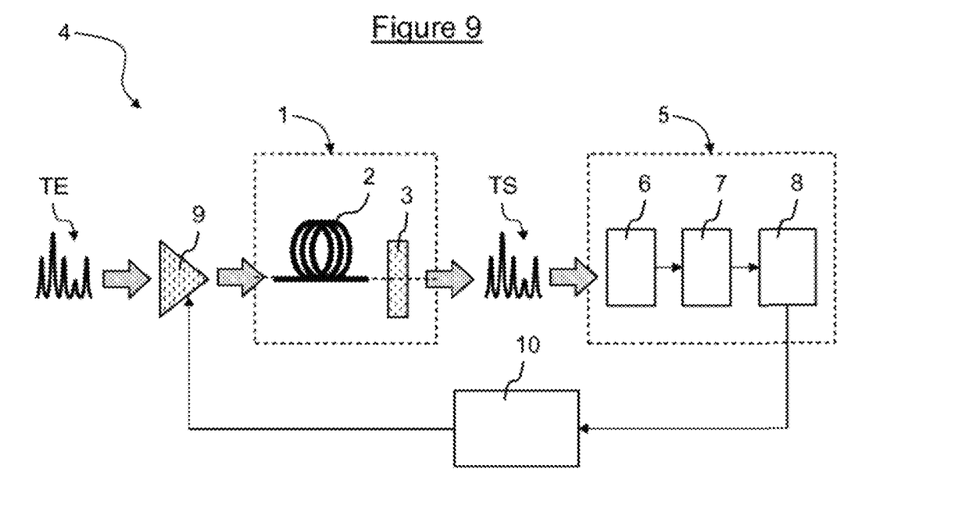
FIG. 9 is a schematic view of an analysis system according to a second embodiment of the invention.

In a preferred embodiment, shown in FIG. 9, an optical amplifier 9 is arranged upstream of the optical processing device 1 so as to optically amplify the signal such that it reaches an optimum peak power $P_E$ with regard to the portion A of the graphical representation of the optical transfer function FT of said device 1, that is to say that the largest possible part of the power range $[P_{EMIN}; P_{EMAX}]$ can be processed in accordance with the invention. Indeed, it is possible that the features of the device 1 (and hence the transfer function FT thereof) are determined irreversibly at the point of manufacture, while the mean power $P_{E\emptyset}$ of the signal TE may be unknown. This amplifier 9 therefore allows this lack of information to be compensated by appropriate adjustment of $P_{E\emptyset}$. On this basis, the amplifier 9 can be of a type which is standard in the field of optical telecommunications, for example an erbium-doped fibre amplifier EDFA.

Furthermore, it is possible to attach to the analysis system 4 an electronic controller 10 which is connected to the signal processing means 8 and the amplifier 9. Owing to an arrangement of this type, it is possible to adjust the $P_{E\emptyset}$ value in accordance with both the variation range $\Delta P_E$ in question and the transfer function FT.

Figure 10:
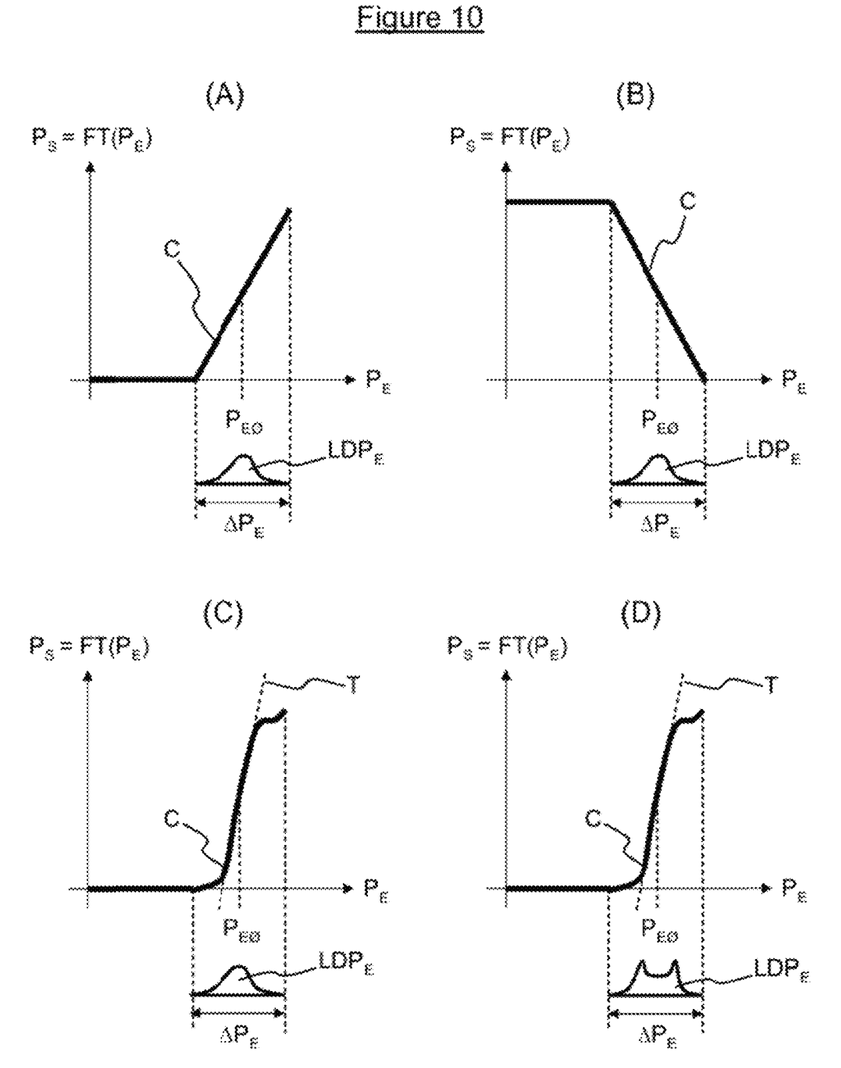
FIG. 10A to 10D are graphs showing different forms of transfer function allowing optical amplification of a signal according to the invention.

The invention has been described in the above for optical amplification of the relative jitter of a signal TE of which the probability density law $LDP_E$ has the form of a Gaussian, by means of an optical processing device of which the transfer function (described above with reference to FIG. 3) rises monotonically and is substantially linear for the operating range $[P_{E\emptyset} - \Delta P_E/2; P_{E\emptyset} + \Delta P_E/2]$. However, the invention of course also applies in other cases, for example:

an optical processing device of which the transfer function FT is linear in pieces, and more particularly, is both linear and rising for the range [$P_{EMIN}$;$P_{EMAX}$] (FIG. 10A);

an optical processing device of which the transfer function FT is linear in pieces, and more particularly, is both linear and falling for the range [$P_{EMIN}$;$P_{EMAX}$]; in this case, the resulting statistical distribution $LDP_S$ is inverted and it is sufficient to electronically re-process the received signal TS in order to return to $LDP_S$ and then $LDP_E$ (FIG. 10B);

an optical processing device of which the transfer function FT is rising and linear around the mean power $P_{E\emptyset}$ (probability density peak of the Gaussian $LDP_E$) but is not linear at the edges (regions of low probability density of the Gaussian); in this case, the majority of the pulses are correctly amplified according to the invention, while the pulses for which the peak power has an extreme value are deformed in a non-linear manner; the law $LDP_E$ is thus returned to by means of prior knowledge of the transfer function FT, in such a way that the linearity defects of FT can be compensated electronically in the device 5 (FIG. 10C); and an optical processing device for amplifying a signal TE of which the probability density law $LDP_E$ does not have the form of a Gaussian (here, for example, having two peaks), the transfer function FT of the device rising and being linear around the two peaks but not being linear elsewhere; in this case, too, it is sufficient to know the form of the function FT in order to electronically compensate the linearity defects thereof in the device 5 (FIG. 10D).

It will be noted that a transfer function FT of which a portion A of the graphical representation is completely monotonic and linear for the range [$P_{EMIN}$;$P_{EMAX}$], and has an input power threshold $PE_S$ in the range]0;$P_{EMIN}$] U [$P_{EMAX}$; $P_{E0}$[, which is the range comprising a first range between 0 and $P_{EMIN}$, 0 excepted and a second range between $P_{EMAX}$ and $P_{E\emptyset}$, $P_{E\emptyset}$ expected, and is suitable for any type of statistical power distribution $LDP_E$. In addition, according to the invention, an all-optical device capable of having this type of optical transfer function is preferably used.

It will also be noted that the invention applies to any type of statistical power distribution of a pulsed optical signal, without it being necessary to previously define hypotheses on the form of this distribution, in particular a non-verifiable hypothesis of Gaussian statistical distribution. Indeed, the invention has the advantage of being able to be applied to any type of distribution, for example uniform, Gaussian or even having a plurality of maxima.

It will also be noted that the invention allows real-time visualisation of the results of the measurement, on the basis of the functions which are conventionally incorporated into an electronic oscilloscope, and this means that resorting to the development of control software or specific electronic tools is avoided. Furthermore, the invention can be used together with commercially available optical elements, and this reduces manufacturing costs.

It will also be noted that the evaluation of the statistical distribution, for example in the form of a histogram, is carried out here in a synchronous manner, and this requires a clock signal. The use of this type of signal can be avoided, in order to simplify the analysis system according to the invention, by means of an asynchronous detection method combined with signal processing means which are arranged in order to compensate the synchronisation defect in the detection.

The invention has been described above for the analysis of an optical signal being in the form of a train of pulses, but a person skilled in the art may of course adapt said invention to other forms of optical signal, for example continuous or alternating. In the case of a continuous signal, the invention allows the power variations thereof to be determined at regular intervals, the rate of repetition being determined by the pace of the photodetector.

The invention has also been described above for application to the analysis of the amplitude (or power) variations of a pulsed optical signal, and this allows an optical source to be characterized, in particular a source emitting telecommunications signals (pulses of which the size is between approximately ten and approximately one hundred picoseconds), a source emitting ultra-short signals (sources known as "mode-locked"), or any optical source (less than one nanosecond) of which the statistical distribution of the fluctuations in amplitude is to be found. However, the invention of course is not limited to this application and is suitable for any other type of application in which the intention is to amplify the power jitter of a signal in a purely optical manner.

In particular, the present invention can be used advantageously in the field of biophotonics, or more generally of photonics, in which it may be desirable to measure small signal variations. Therefore, in order to detect the possible presence of a chemical species in a sample, it is possible, according to a particular use of the invention:

to transmit a train of ultra-short pulses (having zero relative power variation) to the sample to be analysed in order to cause said train to interact with said sample, the chemical species to be detected therefore being likely to cause a single relative power variation capable of constituting a signature of said species;

to optically amplify the relative power variation of the signal after interaction in such a way that the amplified relative power variation exceeds the subsequent electronic measurement noise, in such a way that the low fluctuations of the signal caused by the chemical species to be detected are amplified in a specific manner; and to electronically measure the relative power variation thus amplified of the signal in order to derive therefrom the possible presence of said chemical species.

A use of this type of the processing method according to the invention therefore allows improvement both of the acquisition periods required for reliably measuring the signature of a chemical species to be detected and of the detectability thresholds from which said chemical species is considered to be present. An application of this type can be integrated, although not exclusively, into spectroscopy systems (linear or non-linear), Raman absorption systems, etc.

The invention claimed is:

1. Method for processing an optical signal (TE) whose power ($P_E$) varies in a random manner and is determined by a power probability density law ($LDP_E$) which is included in a power range ([$P_{EMIN}$; $P_{EMAX}$]) which defines a power variation range ($\Delta P_E$) around a mean power ($P_{E\emptyset}$), which method comprising the steps of:

measuring, electronically, the power ($P_E$) of at least one temporal portion of the optical signal (TE), first;

deriving, therefrom, a relative power variation ($G_E$) of the optical signal (TE);

comparing the relative power variation ($G_E$), derived in that manner, with an electronic measurement noise ($G_{ELECTRONIC}$);

amplifying, optically, in accordance with the result of said comparison, the relative power variation ($G_E$) of at least one temporal portion of the optical signal (TE) such that the amplified relative power variation ($G_S$) exceeds the electronic measurement noise ($G_{ELECTRONIC}$), wherein the optical amplification comprises the steps of:

establishing an optical transfer function (FT) whose graphical representation in as graph "input power ($P_E$)–output power ($P_S$)" has at least a substantially monotonic portion (A) which defines an input power threshold ($P_{ES}$) for which the extension (T) of the substantially monotonic portion (A) produces zero output power;

arranging the substantially monotonic portion (A) and the power range ($[P_{EMIN}; P_{EMAX}]$) in such a manner that:

said substantially monotonic portion (A) includes substantially at least the portion of the power range ($[P_{EMIN}; P_{EMAX}]$) for which the power probability density ($LDP_E$) is high and said power threshold ($P_{ES}$) is outside the power range ($[P_{EMIN}; P_{EMAX}]$) and has a deviation with respect to said mean power ($P_{E\emptyset}$) which is substantially less than said mean power ($P_{E\emptyset}$) and applying said substantially monotonic portion (A) to at least one temporal portion of the optical signal (TE) in order to optically amplify the relative power variation ($G_E$) of said temporal portion; and after optical amplification of the relative power variation ($G_E$) of at least one temporal portion of the optical signal (TE), measuring, electronically, the power ($P_S$) of said temporal portion in order to analyse the power variations of the optical signal (TE).

2. Method according to claim 1, wherein, the optical signal (TE) being in the form of a train of pulses (E), the relative power variation ($G_E$) is optically amplified between at least two of said pulses (E).

3. Method according to claim 1, wherein, for a subsequent measurement of the optical signal (TE), the substantially monotonic portion (A) is applied to at least one temporal portion of the optical signal (TE) in order to optically amplify the relative power variation ($G_E$) of said temporal portion in such a way that the amplified relative power variation ($G_S$) exceeds the noise ($G_{ELECTRONIC}$) produced by the subsequent measurement.

4. Method according to claim 1, wherein the substantially monotonic portion (A) of the graphical representation of the transfer function (FT) substantially includes the power range ($[P_{EMIN}; P_{EMAX}]$).

5. Method according to claim 4, wherein the substantially monotonic portion (A) of the graphical representation of the transfer function (FT) substantially increases over the power range ($[P_{EMIN}; P_{EMAX}]$).

6. Method according to claim 1, wherein the substantially monotonic portion (A) of the graphical representation of the transfer function (FT) is substantially linear over the power range ($[P_{EMIN}; P_{EMAX}]$).

7. Method according to claim 1, wherein the input power threshold ($P_{ES}$) is substantially close to the power range ($[P_{EMIN}; P_{EMAX}]$).

8. Device (1) for carrying, out the method for amplifying an optical signal (TE) according to claim 1, which device (1) comprises:

means (2, 3) for establishing an optical transfer function (FT) whose graphical representation in a graph "optical input power ($P_E$)–optical output power ($P_S$)" has at least a substantially monotonic portion (A) which defines an input power threshold ($P_{ES}$) for which the extension (T) of the substantially monotonic portion (A) produces zero output power and means for applying said substantially monotonic portion (A) to at least one temporal portion of the optical signal (TE) in order to optically amplify the relative power variation ($G_E$) of said temporal portion.

9. Device (1) according to claim 8, wherein the means (2, 3) for establishing the optical transfer function (FT) comprise at least one optical element (2) having non-linear optical properties.

10. Device (1) according to claim 8, which is arranged upstream of a device (5) for electronically measuring the power ($P_S$) of the optical signal (TS) in order to analyse, after optical amplification of the relative power variation ($G_E$) of at least one temporal portion of the optical signal (TE), the power variations of said optical signal (TE).

11. Device (1) according to claim 10, for which the random power ($P_E$) of the optical signal (TE) is included in a power range ($[P_{EMIN}; P_{EMAX}]$), which device (1) is arranged downstream of an optical amplifier (9), the amplifier (9) being connected to the electronic measurement device (5) by means of an electronic controller (10) in order to adjust the power range ($[P_{EMIN}; P_{EMAX}]$) of the optical signal (TE) in relation to the substantially monotonic portion (A) in accordance with a previous electronic measurement of the power ($P_S$) of at least one portion of said optical signal (TS) whose relative power variation ($G_E$) has been amplified.

12. Method for detecting a chemical species in a sample, according to which:

an optical signal (TE) having zero relative power variation is transmitted to the sample in order to cause said optical signal (TE) to interact with said sample; and the relative power variation ($G_E$) of said optical signal (TE) is measured after interaction with said sample in order to detect the presence of said chemical species, said relative variation measurement producing a measurement noise ($G_{ELECTRONIC}$), which method is characterised in that the processing method according to claim 1 is applied to the optical signal (TE) after interaction with said sample and before the measurement of said relative power variation ($G_E$) in such a way that the amplified relative power variation ($G_S$) of the optical signal (TE) after interaction exceeds said measurement noise ($G_{ELECTRONIC}$).

* * * * *